US012803489B2

(12) United States Patent
Miyachi et al.

(10) Patent No.: US 12,803,489 B2
(45) Date of Patent: Nov. 17, 2026

(54) MOTOR DRIVE CIRCUIT

(71) Applicant: TOYOTA BOSHOKU KABUSHIKI KAISHA, Aichi (JP)

(72) Inventors: Reina Miyachi, Toyota (JP); Naoya Hanada, Toyota (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 281 days.

(21) Appl. No.: 18/734,085

(22) Filed: Jun. 5, 2024

(65) Prior Publication Data

US 2024/0421744 A1 Dec. 19, 2024

(30) Foreign Application Priority Data

Jun. 15, 2023 (JP) ................................ 2023-098514

(51) Int. Cl.

*H03K 19/003* (2006.01)
*H02P 29/032* (2016.01)
*B60N 2/02* (2006.01)

(52) U.S. Cl.

CPC ........ *H02P 29/032* (2016.02); *B60N 2/02246* (2023.08)

(58) Field of Classification Search

CPC .......... H02P 29/032; H02P 7/04; H02P 6/085; B60N 2/02246; H02M 1/32; H02M 1/36; H02M 1/385; H02M 7/53871

See application file for complete search history.

(56) References Cited

U.S. PATENT DOCUMENTS

| | | | | |
|---|---|---|---|---|
| 7,309,968 B2 * | 12/2007 | Strike | H02P 6/00 363/39 |
| 2005/0088212 A1 * | 4/2005 | Leith | H02M 3/156 327/198 |
| 2009/0096511 A1 * | 4/2009 | Ueunten | H03K 17/122 327/543 |
| 2015/0381032 A1 * | 12/2015 | Li | H02M 1/36 323/271 |

FOREIGN PATENT DOCUMENTS

| | | |
|---|---|---|
| JP | 2011-20522 | 2/2011 |
| JP | 2015-171206 | 9/2015 |

OTHER PUBLICATIONS

TIDUC70A:IGBT Gate Driver Reference Design for Parallel IGBTs With Short-Circuit Protection and External BJT Buffer; TIDUC70A—Dec. 2016—Revised Jan. 2017 (Year: 2017).*

* cited by examiner

*Primary Examiner* — Muhammad S Islam
(74) *Attorney, Agent, or Firm* — GREENBLUM & BERNSTEIN, P.L.C.

(57) ABSTRACT

One aspect of the present disclosure provides a motor drive circuit including: first through fourth FETs forming a full-bridge circuit; first through fourth driver circuits; a control circuit; and a switch. The switch operates at least one of the first through fourth driver circuits such that at least one of the first through fourth driver circuits outputs at least one of first through fourth high voltages to at least one of gates of the first through fourth FETs, during the sleep mode of the control circuit.

7 Claims, 3 Drawing Sheets

MOTOR DRIVE CIRCUIT

CROSS-REFERENCE TO RELATED APPLICATIONS

The present application claims the benefit of Japanese Patent Application No. 2023-098514 filed on Jun. 15, 2023 with the Japan Patent Office, the entire disclosure of which is incorporated herein by reference.

BACKGROUND

The present disclosure relates to a motor drive circuit.

Unexamined Japanese Patent Application Publication No. 2015-171206 discloses an inverter circuit configured to drive an electric motor through an active high switch. The "active high switch" as used herein refers to a switch configured to turn on in response to a receipt of the positive logic signal.

SUMMARY

A typical motor drive circuit comprises (i) four field-effect transistors (FETs), (ii) four driver circuits each configured to turn on or off the respective FETs, and (iii) a controller configured to control the respective outputs from the driver circuits (that is, the respective voltages applied to the respective gates of the FETs).

In a case where each of the aforementioned driver circuits comprises a bipolar transistor, standby currents in all of the driver circuits can be reduced by the controller outputting the negative logic signals to all of the driver circuits when the controller is in the sleep mode.

However, the aforementioned driver circuits may be configured to operate in a negative logic (that is, active low). Such driver circuits turn on the respective FETs in response to the driver circuits receiving the negative logic signals, and turns off the respective FETs in response to the driver circuits receiving the positive logic signals.

Therefore, when the controller outputs the negative logic signals to the four driver circuits in order to reduce the standby current in the motor drive circuit in the sleep mode, all of the four FETs turn on causing so-called "arm short-circuit". As a result, the motor drive circuit may be damaged by the through-current flowing through the motor drive circuit.

In one aspect of the present disclosure, it is desirable to be able to reduce a standby current and a through-current in a motor drive circuit in a sleep mode. One aspect of the present disclosure provides a motor drive circuit configured to drive an electric motor for a vehicle seat. The motor drive circuit comprises first through fourth field-effect transistors (FETs), first through fourth driver circuits, a control circuit, and a switch.

The first through fourth FETs form a full-bridge circuit. The first and second FETs are high-side switches of the full-bridge circuit. The third and fourth FETs are low-side switches of the full-bridge circuit. The first through fourth FETs are configured (i) to shift to their respective on-states in response to their respective gates respectively receiving first through fourth low voltages and (ii) to shift to their respective off-states in response to the respective gates respectively receiving first through fourth high voltages. The first through fourth high voltages are higher than the first through fourth voltages, respectively.

The first through fourth driver circuits comprise first through fourth bipolar transistors, respectively. The first through fourth bipolar transistors are configured (i) to shift to their respective on-states in response to their respective bases respectively receiving first through fourth positive logic signals and (ii) to shift to their respective off-states in response to the respective bases respectively receiving first through fourth negative logic signals. The first through fourth driver circuits are configured (i) to output the first through fourth low voltages to the respective gates of the first through fourth FETs in response to the first through fourth bipolar transistors being in the respective on-states and (ii) to output the first through fourth high voltages to the respective gates of the first through fourth FETs in response to the first through fourth bipolar transistors being in the respective off-states.

The control circuit is configured to output the first through fourth positive logic signals or the first through fourth negative logic signals to the respective bases of the first through fourth bipolar transistors. The control circuit is configured to output the first through fourth negative logic signals to the respective bases of the first through fourth bipolar transistors during a sleep mode of the control circuit.

The switch is configured to operate at least one of the first through fourth driver circuits such that the at least one of the first through fourth driver circuits outputs at least one of the first through fourth high voltages during the sleep mode of the control circuit.

In the motor drive circuit configured as such, the control circuit outputs the first through fourth negative logic signals to the first through fourth driver circuits during the sleep mode of the control circuit. As a result, a standby current flowing through the first through fourth driver circuits can be reduced.

Further, the at least one of the first through fourth driver circuits is operated by the switch during the sleep mode of the control circuit such that the at least one of the first through fourth driver circuits outputs the at least one of the first through fourth high voltages. As a result, the at least one of the first through fourth FETs is turned off, and the through-current can be reduced.

The motor drive circuit may have its ground. The first through fourth driver circuits may comprise their respective output stages coupled to the respective gates of the first through fourth FETs. The respective output stages may be configured (i) to respectively output the first through fourth low voltages in response to the respective output stages being electrically coupled to the ground and (ii) to respectively output the first through fourth high voltages in response to the respective output stages being electrically decoupled from the ground. The switch may be configured to electrically decouple at least one of the respective output stages from the ground during the sleep mode of the control circuit.

The switch may be a semiconductor switch configured to shift to its off-state to thereby electrically decouple the at least one of the respective output stages from the ground. Examples of the semiconductor switch include a Darlington transistor.

The first and second FETs may comprise (i) their respective sources coupled to a positive electrode of a power supply of the electric motor and (ii) their respective drains coupled to the electric motor. The third and fourth FETs may comprise (i) their respective sources coupled to the electric motor and (ii) their respective drains coupled to the ground.

The switch may be configured to operate the first driver circuit and/or the second driver circuit such that the first driver circuit and/or the second driver circuit outputs the first high voltage and/or the second high voltage, in response to the switch receiving the third and fourth negative logic signals.

The motor drive circuit may comprise a first transmission path configured to transmit the third positive logic signal and the third negative logic signal from the control circuit to the third driver circuit. The motor drive circuit may comprise a second transmission path configured to transmit the fourth positive logic signal and the fourth negative logic signal from the control circuit to the fourth driver circuit. The motor drive circuit may comprise a first diode including (i) a first cathode coupled to the switch and (ii) a first anode coupled to the first transmission path. The motor drive circuit may comprise a second diode including (i) a second cathode coupled to the switch and (ii) a second anode coupled to the second transmission path.

In the control circuit configured as such, the switch operates the first driver circuit and/or the second driver circuit in response to the third negative logic signal for the third driver circuit, or the fourth negative logic signal for the fourth driver circuit. Thus, the control circuit is not required to output an additional negative logic signal for the switch. Further, the first diode prevents the fourth positive logic signal from being transmitted to the third driver circuit in a situation where (i) the third negative logic signal is being output to the switch, and (ii) the fourth positive logic signal is being output to the switch. The second diode prevents the third positive logic signal from being transmitted to the fourth driver circuit in a situation where (i) the third positive logic signal is being output to the switch, and (ii) the fourth negative logic signal is being output to the switch.

The motor drive circuit may be a microcomputer comprising first through fourth output ports. The first through fourth output ports may be configured to respectively output the first though fourth positive logic signals or the first through fourth negative logic signals.

The motor drive circuit may comprise a first circuit board including the control circuit, and a second circuit board (i) distinct from the first circuit board and (ii) including the first through fourth FETs, the first through fourth driver circuits, and the switch.

In a case where the second circuit board is stacked over the first circuit board, or the first circuit board is stacked over the second circuit board, an area required to dispose the motor drive circuit can be reduced.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENT

Figure 1:
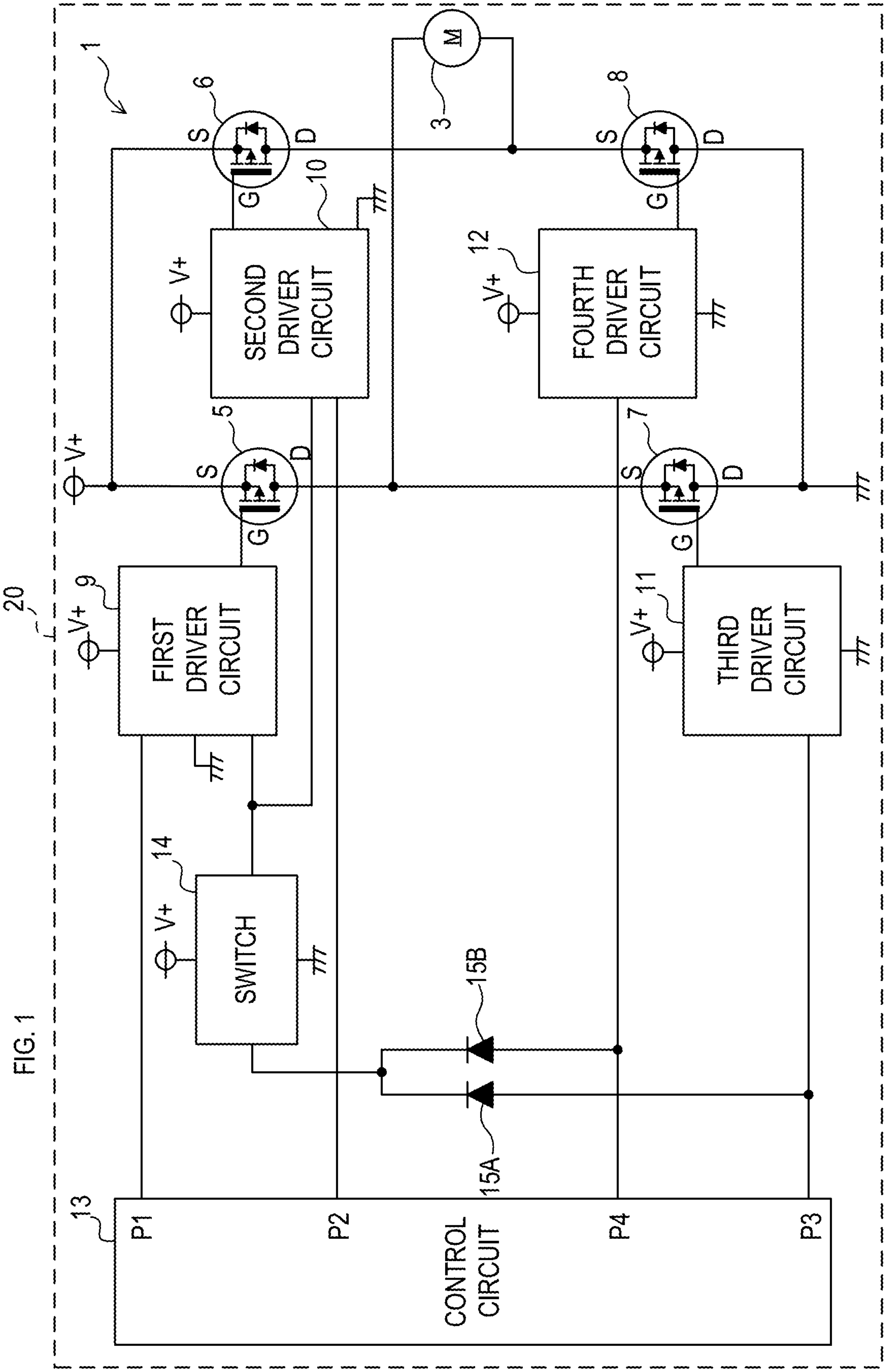
FIG. 1 is a circuit diagram of a motor drive circuit according to an embodiment.

The present embodiment described below is one example of embodiments that fall within the technical scope of the present disclosure. In other words, the appended claims are not limited to specific configurations or structures shown in the present embodiment below.

The present embodiment provides an example in which a motor drive circuit according to the present disclosure is applied to a seat to be mounted on a vehicle (hereinafter, simply referred to as "seat"). At least a member or a portion described with a reference numeral is provided at least one in number unless there is a specifying term, such as "only one".

1. Overview of Motor Drive Circuit

The present embodiment provides a motor drive circuit 1 shown in FIG. 1. The motor drive circuit 1 is configured to drive an electric motor 3 mounted on a seat 20. The electric motor 3 is configured to serve as a driving source for sliding apparatus (not shown) or reclining apparatus (not shown) in the seat 20. In the present embodiment, the motor drive circuit 1 is also mounted on the seat 20. However, it is not always necessarily for the motor drive circuit 1 to be mounted on the seat 20.

2. Configuration of Motor Drive Circuit

The motor drive circuit 1 comprises at least first through fourth FETs 5 through 8, first through fourth driver circuits 9 through 12, a control circuit 13, a switch 14, and first and second diodes 15A and 15B. In the present embodiment, the first through fourth FETs 5 through 8 are p-channel enhancement-mode metal-oxide-semiconductor field-effect transistors (MOSFETs). In another embodiment, the first through fourth FETs 5 through 8 may be p-channel junction field-effect transistors (JFETs).

The first through fourth FETs 5 through 8 form a full-bridge circuit (in other words, H-bridge circuit). More specifically, the first and second FETs 5 and 6 are high-side switches, and their sources(S) are coupled to a positive electrode V+ of a power supply. The power supply provides DC power to the motor drive circuit 1 and the electric motor 3. The third and fourth FETs 7 and 8 are low-side switches, and their drains (D) are coupled to the ground (GND) of the motor drive circuit 1. The ground has an electric potential equal to that of a negative electrode of the power supply. The drains of the first and second FETs 5 and 6 are coupled to the respective sources of the third and fourth FETs 7 and 8. The electric motor 3 comprises (i) a first terminal coupled to the drain of the first FET 5 and the source of the third FET 7, and (ii) a second terminal coupled to the drain of the second FET 6 and the source of the fourth FET 8.

The first through the fourth driver circuits 9 through 12 are configured to turn on or off the first through fourth FETs 5 through 8, respectively. Specifically, the first and second driver circuits 9 and 10 are configured to apply voltages to the respective gates (G) of the first and second FETs 5 and 6. The third and fourth driver circuits 11 and 12 are configured to apply voltages to the respective gates of the third and fourth FETs 7 and 8.

Each of the first through fourth driver circuits 9 through 12 comprises one or more bipolar transistors (in the present embodiment, three bipolar transistors).

The control circuit 13 is configured to individually control the first through fourth driver circuits 9 through 12. In the present embodiment, the control circuit 13 is, but not limited to, a microcomputer. The control circuit 13 comprises first through fourth output ports P1 through P4, and is configured to output first through fourth negative logic signals or first through fourth positive logic signals from the first through fourth output ports P1 through P4, respectively, in order to control the first through fourth FETs 5 through 8. Each of the first through fourth negative logic signals has a first voltage (in the present embodiment, substantially 0 volts), and each of the first through fourth positive logic signals has a second voltage (for example, substantially 5 volts) that is higher than the first voltage.

The switch 14 is configured to operate the first and second driver circuits 9 and 10 so that (i) a voltage between the gate and the source of the first FET 5, and (ii) a voltage between the gate and the source of the second FET 6 are set at a low voltage or a high voltage. In the present embodiment, the switch 14 comprises a semiconductor switch. The aforementioned low voltage has a magnitude that turns off the first and second FETs 5 and 6 (in the present embodiment, substantially 0 volts). The aforementioned high voltage has a magnitude that turns on the first and second FETs 5 and 6 (in the present embodiment, substantially equal to the voltage of the positive electrode V+ of the power supply).

Figure 2:
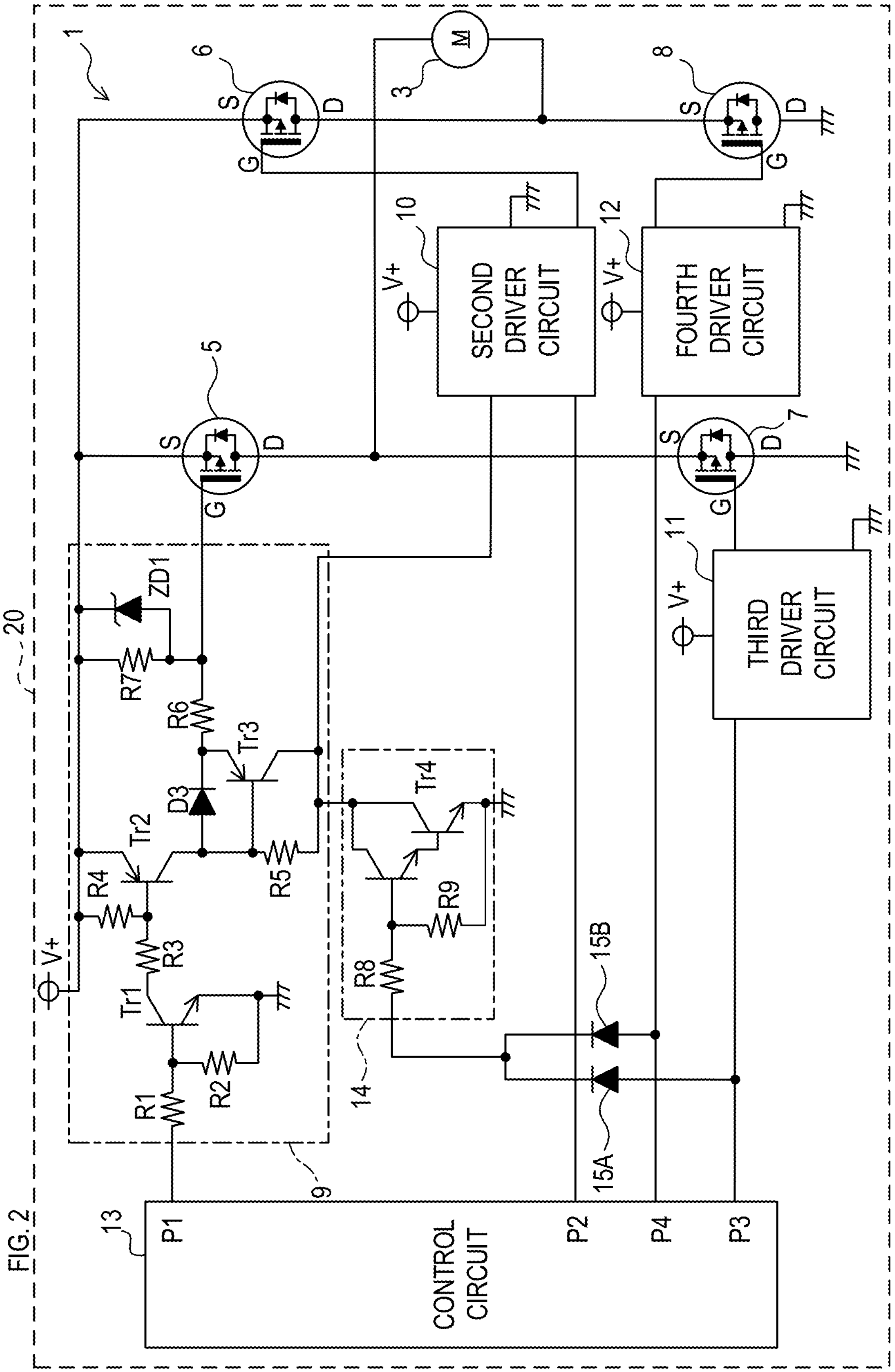
FIG. 2 is a circuit diagram illustrating details of a first driver circuit and a switch in the circuit diagram of FIG. 1.

As shown in FIG. 2, in the present embodiment, the first driver circuit 9 comprises (i) an input stage including a first bipolar transistor Tr1, and (ii) an output stage including second and third bipolar transistors Tr2 and Tr3.

The first bipolar transistor Tr1 is an NPN bipolar transistor. The second and third bipolar transistors Tr2 and Tr3 are PNP bipolar transistors.

The base of the first bipolar transistor Tr1 is coupled to the first output port P1 of the control circuit 13 via a first resistor R1. The emitter of the first bipolar transistor Tr1 is coupled to the ground, and also to the base of the first bipolar transistor Tr1 via a second resistor R2. The collector of the first bipolar transistor Tr1 is coupled to the positive electrode V+ of the power supply via third and fourth resistors R3 and R4.

The base of the second bipolar transistor Tr2 is coupled to the collector of the first bipolar transistor Tr1 via the third resistor R3. The emitter of the second bipolar transistor Tr2 is coupled to the positive electrode V+ of the power supply. The collector of the second bipolar transistor Tr2 is coupled to the switch 14 via a fifth resistor R5.

The base of the third bipolar transistor Tr3 is coupled to the collector of the second bipolar transistor Tr2. The emitter of the third bipolar transistor Tr3 is coupled to the positive electrode V+ of the power supply via sixth and seventh resistors R6 and R7. The emitter of the third bipolar transistor Tr3 is also coupled to the collector of the second bipolar transistor Tr2 via a third diode D3. The anode of the third diode D3 is coupled to the collector of the second bipolar transistor Tr2. The cathode of the third diode D3 is coupled to the emitter of the third bipolar transistor Tr3. The emitter of the third bipolar transistor Tr3 is also coupled to the gate of the first FET 5 via the sixth resistor R6.

The output stage of the first driver circuit 9 further comprises a Zener diode ZD1. The cathode of the Zener diode ZD1 is coupled to the positive electrode V+ of the power supply. The anode of the Zener diode ZD1 is coupled to the gate of the first FET 5.

In the first driver circuit 9 configured as such, the first bipolar transistor Tr1 turns on in response to the base of the first bipolar transistor Tr1 receiving the first positive logic signal from the first output port P1, and then the second bipolar transistor Tr2 also turns on. Provided that the switch 14 is in its on-state when the second bipolar transistor Tr2 turns on, the third bipolar transistor Tr3 turns on subsequently. While the third bipolar transistor Tr3 is in its on-state, the aforementioned low voltage is continuously applied to the gate of the first FET 5.

The first bipolar transistor Tr1 turns off in response to the base of the first bipolar transistor Tr1 receiving the first negative logic signal from the first output port P1, and then the second and third bipolar transistors Tr2 and Tr3 also turn off. While the third bipolar transistor Tr3 is in its off-state, the aforementioned high voltage is continuously applied to the gate of the first FET 5.

In the present embodiment, the second driver circuit 10 has the same electrical configuration as the first driver circuit 9. Although the third and fourth driver circuits 11 and 12 have the same electrical configurations as the first driver circuit 9, the third and fourth driver circuits 11 and 12 are different from the first driver circuit 9 in that the collector of their respective third bipolar transistors Tr3 is coupled to the ground not through switch 14.

In the present embodiment, the switch 14 comprises a Darlington transistor Tr4. The base of the Darlington transistor Tr4 is coupled to the cathodes of the first and second diodes 15A and 15B via an eighth resistor R8. The collector of the Darlington transistor Tr4 is coupled to the collector of the third bipolar transistor Tr3 included in the first driver circuit 9. The emitter of the Darlington transistor Tr4 is coupled to the ground. The emitter of the Darlington transistor Tr4 is also coupled to the base of the Darlington transistor Tr4 via a ninth resistor R9.

The anodes of the first and second diodes 15A and 15B are respectively coupled to the third and fourth output ports P3 and P4 of the control circuit 13. In the switch 14 configured as such, in response to the base of the Darlington transistor Tr4 receiving the third positive logic signal from the third output port P3, or the fourth positive logic signal from the fourth output port P4, the Darlington transistor Tr4 turns on so as to electrically couple the collectors of the third bipolar transistors Tr3 included in the first and second driver circuits 9 and 10 to the ground.

In response to the third negative logic signal being output from the third output port P3, and also the fourth negative logic signal being output from the fourth output port P4, the Darlington transistor Tr4 turns off so as to electrically decouple the collectors of the third bipolar transistors Tr3 included in the first and second driver circuits 9 and 10 from the ground.

The first diode 15A prevents the fourth positive logic signal from being transmitted to the third driver circuit 11 in a situation where (i) the third negative logic signal is being output from the third output port P3, and (ii) the fourth positive logic signal is being output from the fourth output port P4.

The second diode 15B prevents the third positive logic signal from being transmitted to the fourth driver circuit 12 in a situation where (i) the third positive logic signal is being output from the third output port P3, and (ii) the fourth negative logic signal is being output from the fourth output port P4.

The control circuit 13 outputs one of the first through fourth positive logic signals to a corresponding one of the first through fourth driver circuits 9 through 12, in order to turn on a corresponding one of the first through fourth FETs 5 through 8. The control circuit 13 outputs the first through fourth negative logic signals to the first through fourth driver circuits 9 through 12 respectively, when the control circuit 13 is in its sleep mode.

3. Implementation of Motor Drive Circuit

Figure 3:
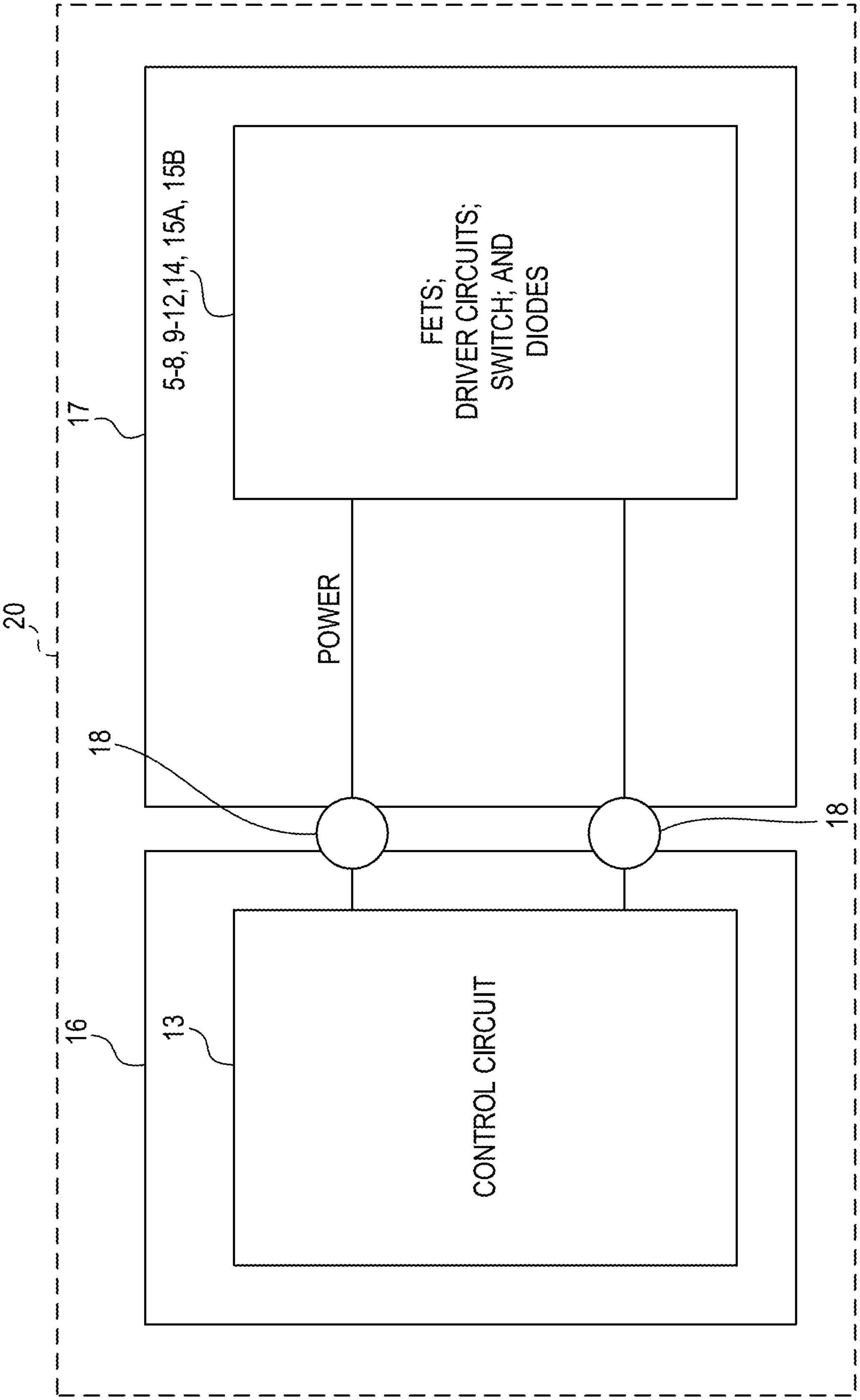
FIG. 3 is a schematic view illustrating an arrangement of the motor drive circuit.

As shown in FIG. 3, the control circuit 13 is implemented on a first circuit board 16. The first through fourth FETs 5 through 8, the first through fourth driver circuits 9 through 12, the switch 14, and the first and second diodes 15A and 15B are implemented on a second circuit board 17. The first circuit board 16 is electrically coupled to the second circuit board 17 via coupling components 18.

In the present embodiment, the second circuit board 17 is stacked over the first circuit board 16 in the seat 20. In another embodiment, the first circuit board 16 may be stacked over the second circuit board 17.

4. Technical Effects of Present Embodiment

The control circuit 13 outputs the first through fourth negative logic signals to all of the first through fourth driver circuits 9 through 12 when the control circuit 13 is in its sleep mode. Therefore, it is possible in the motor drive circuit 1 to reduce a standby current in each of the first through fourth driver circuits 9 through 12.

The switch 14 electrically decouples the collectors of the third bipolar transistors Tr3 included in the first and second driver circuits 9 and 10 from the ground when the control circuit 13 is in the sleep mode and outputting the third and fourth negative logic signals. As a result, the first and second driver circuits 9 and 10 apply the high voltages to the gates of the first and second FETs 5 and 6. In this state, the voltage between the gate and the source of the first FET 5, and the voltage between the gate and the source of the second FET 6 are substantially 0 volts, and thus the first and second FETs 5 and 6 turn off. Therefore, it is possible to inhibit a through-current from flowing through the motor drive circuit 1, more specifically, through the full-bridge circuit.

When the control circuit 13 is not in the sleep mode, the control circuit 13 outputs the third positive logic signal to the third driver circuit 11 and/or the fourth positive logic signal to the fourth driver circuit 12. As a result, the switch 14 electrically couple the collectors of the third bipolar transistors Tr3 included in the first and second driver circuits 9 and 10 to the ground. In this state, each of the first and second FETs 5 and 6 (*i*) turns on in response to a corresponding one of the first positive logic signal and the second positive logic signal, or (ii) turns off in response to a corresponding one of the first negative logic signal and the second negative logic signal.

Since the switch 14 turns on in response to the third positive logic signal for the third driver circuit 11, or the fourth positive logic signal for the fourth driver circuit 12, it is not necessary to provide the control circuit 13 with an additional output port for outputting an additional signal to turn on the switch 14.

The control circuit 13 is implemented on the first circuit board 16, whereas the first through fourth FETs 5 through 8, the first through fourth driver circuits 9 through 12, the switch 14, and the first and second diodes 15A and 15B are implemented on the second circuit board 17. Since the second circuit board 17 is stacked over the first circuit board 16, it is possible to reduce an area occupied by the first and second circuit boards 16 and 17 in the seat 20.

5. Correspondence Between Terms

In the present embodiment, the first bipolar transistor Tr1 in each of the first through fourth driver circuits corresponds to an example of each of the first through fourth bipolar transistors recited in the appended claims. Each of the high voltages output from the first though fourth driver circuits 9 through 12 corresponds to an example of each of the first through fourth high voltages recited in the appended claims. Each of the low voltages output from the first though fourth driver circuits 9 through 12 corresponds to an example of each of the first through fourth low voltages recited in the appended claims.

6. Other Embodiments

In the aforementioned embodiment, the switch 14 is coupled to the first and second driver circuits 9 and 10. However, the present disclosure is not limited thereto. The switch 14 may be coupled to the third driver circuit 11 and/or the fourth driver circuit 12, instead of the first and second driver circuits 9 and 10. Alternatively, the switch 14 may be coupled to any one or all of the first through fourth driver circuits 9 through 12.

In the aforementioned embodiment, the switch 14 comprises the Darlington transistor Tr4. However, the present disclosure is not limited thereto. The switch 14 may comprise a semiconductor switch other than the Darlington transistor Tr4.

In the aforementioned embodiment, the motor drive circuit according to the present disclosure is applied to the seat 20 to be mounted on a vehicle. However, the present disclosure is not limited thereto. The present disclosure may be applied, for example, to seats for use in various vehicles including railroad vehicles, ships and air crafts, as well as stationary seats for use in theaters, homes, and other places.

Further, the present disclosure is not limited to the aforementioned embodiment as long as it falls within the spirit of the disclosure described in the aforementioned embodiment. Accordingly, the present disclosure may be the aforementioned embodiment configured without either the components shown in the drawings or the components described with reference numerals.

What is claimed is:

1. A motor drive circuit configured to drive an electric motor for a vehicle seat, comprising:

first through fourth field-effect transistors (FETs) forming a full-bridge circuit, the first and second FETs being high-side switches of the full-bridge circuit, the third and fourth FETs being low-side switches of the full-bridge circuit, the first through fourth FETs being configured (i) to shift to their respective on-states in response to their respective gates respectively receiving first through fourth low voltages and (ii) to shift to their respective off-states in response to the respective gates respectively receiving first through fourth high voltages, the first through fourth high voltages being higher than the first through fourth low voltages, respectively;

first through fourth driver circuits respectively comprising first through fourth bipolar transistors, the first through fourth bipolar transistors being configured (i) to shift to their respective on-states in response to their respective bases respectively receiving first through fourth positive logic signals and (ii) to shift to their respective off-states in response to the respective bases respectively receiving first through fourth negative logic signals, the first through fourth driver circuits being configured (i) to output the first through fourth low voltages to the respective gates of the first through fourth FETs in response to the first through fourth bipolar transistors being in the respective on-states and (ii) to output the first through fourth high voltages to the respective gates of the first through fourth FETs in response to the first through fourth bipolar transistors being in the respective off-states;

a control circuit configured to output the first through fourth positive logic signals or the first through fourth negative logic signals to the respective bases of the first through fourth bipolar transistors, wherein the control circuit is configured to output the first through fourth negative logic signals to the respective bases of the first through fourth bipolar transistors during a sleep mode of the control circuit; and a switch configured to operate at least first and second driver circuits of the first through fourth driver circuits, wherein:

the motor drive circuit has a ground;

the first through fourth driver circuits comprise their respective output stages coupled to the respective gates of the first through fourth FETs;

the respective output stages of the first and second driver circuits are (i) coupled to a positive electrode of a power supply of the electric motor and (ii) coupled to the ground via the switch; and the switch is configured to electrically decouple the respective output stages of the first and second driver circuits from the ground during the sleep mode of the control circuit.

2. The motor drive circuit according to claim 1, wherein the switch is a semiconductor switch configured to shift to its off-state to thereby electrically decouple the respective output stages of the first and second driver circuits from the ground.

3. The motor drive circuit according to claim 1, wherein:

the first and second FETs comprise (i) their respective sources coupled to the positive electrode of the power supply and (ii) their respective drains coupled to the electric motor; and the third and fourth FETs comprise (i) their respective sources coupled to the electric motor and (ii) their respective drains coupled to the ground.

4. The motor drive circuit according to claim 1, wherein:

the switch is configured to operate the first driver circuit and/or the second driver circuit such that the first driver circuit and/or the second driver circuit outputs the first high voltage and/or the second high voltage, in response to the switch receiving the third and fourth negative logic signals.

5. The motor drive circuit according to claim 1, wherein:

the control circuit is a microcomputer comprising first through fourth output ports; and the first through fourth output ports are configured to respectively output the first through fourth positive logic signals or the first through fourth negative logic signals.

6. The motor drive circuit according to claim 1, further comprising:

a first circuit board including the control circuit; and a second circuit board (i) that is physically separated from the first circuit board and (ii) including the first through fourth FETs, the first through fourth driver circuits, and the switch.

7. The motor drive circuit according to claim 4, further comprising:

a first transmission path configured to transmit the third positive logic signal and the third negative logic signal from the control circuit to the third driver circuit;

a second transmission path configured to transmit the fourth positive logic signal and the fourth negative logic signal from the control circuit to the fourth driver circuit;

a first diode including (i) a first cathode coupled to the switch and (ii) a first anode coupled to the first transmission path; and a second diode including (i) a second cathode coupled to the switch and (ii) a second anode coupled to the second transmission path.

* * * * *